(12) United States Patent
Shamshoum et al.

(10) Patent No.: US 6,245,857 B1
(45) Date of Patent: Jun. 12, 2001

(54) COMPOSITIONS USEFUL FOR TOUGH, HIGH CRYSTALLINITY FILMS

(75) Inventors: Edwar Shoukri Shamshoum, Houston, TX (US); Sehyun Kim, Murrysville, PA (US); Theodore G. Harris, III, Seabrook; Aiko Hanyu, Houston, both of TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/255,280

(22) Filed: Feb. 22, 1999

(51) Int. Cl.[7] .......................... C08L 23/12; C08F 110/06; B32B 27/08

(52) U.S. Cl. .......................... 525/240; 526/351; 428/516

(58) Field of Search .......................... 525/240; 526/351; 428/516, 394

(56) References Cited

U.S. PATENT DOCUMENTS

| | | | |
|---|---|---|---|
| 5,260,395 | * 11/1993 | Asanuma et al. | 526/348.1 |
| 5,969,021 | * 10/1999 | Reddy et al. | 524/229 |
| 6,063,482 | * 5/2000 | Peiffer et al. | 428/213 |
| 6,080,818 | * 6/2000 | Thakker et al. | 525/240 |

* cited by examiner

*Primary Examiner*—David W. Wu
*Assistant Examiner*—R. Harlan
(74) *Attorney, Agent, or Firm*—Evan K. Butts; Jim D. Wheelington

(57) ABSTRACT

Provided is polyolefin composition, the majority of which is highly isotactic polypropylene, comprising the property of heat of melting ($\Delta H_m$) greater than or equal to about 89 J/g.

22 Claims, No Drawings

COMPOSITIONS USEFUL FOR TOUGH, HIGH CRYSTALLINITY FILMS

FIELD OF THE INVENTION

This invention relates to the use of highly crystalline polypropylene (HCPP) for film applications. Soft, strong films may be made by the practice of this invention.

BACKGROUND OF THE INVENTION

It is known that HCPP or highly isotactic polypropylene, being polymer with a particularly low error rate, finds use in injection molding applications with usable handling characteristics and beneficial product results. Generally HCPP is recognized as a comparatively brittle material which is limited in its usefulness by its inherently brittle nature.

Use in film applications, particularly, has not been considered for HCPP in light of the material's tendency to be brittle, tear easily, and have an unpleasant or "hard" feeling to the touch.

Generally those in the field of development of useful polymer compositions have tended to bypass highly isotactic poly-α-olefin in light of its processing difficulty and properties liabilities. Such material is avoided in spite of the potential benefits to be gained from its high level of crystallinity including enhanced strength.

To take advantage of the properties of highly crystalline polyolefin yet mitigate its brittleness some have pursued composite or multi-layer films. An example of such strategy is found in JP 844 167 filed Dec. 1, 1984 and assigned to Sumitomo Chemical Industries, K.K.

Others, as demonstrated by Shel et al. in U.S. Pat. No. 5,603,696 as issued Feb. 18, 1997, have sought to gain advantage of moderate crystallinity of isotactic polypropylene by including up to about 15% of it in a blend of polypropylene with moderate syndiotactic character.

Goins et al. describe, in EP 747 430 published Nov. 12, 1996, blend of isotactic polypropylene and syndiotactic polypropylene having comparatively broad MWD, in an amount of up to 4 wt. %. Polymer used is, however, standard isotactic polypropylene, not the HCPP of the current invention.

Others, including DeLucia et al. describe, in WO 9623095, use the lower melt point or flow temperature of sPP simply to provide an agent for thermal point bonding in non-woven fabric applications. Use of HCPP in combinations with sPP, however, is not demonstrated.

JP 7 149 968 A, as published Jun. 13, 1995, JP 7 126 458 A as published May 16, 1995, and EP 650 818 A3 as published Jun. 14, 1995, all of which are assigned to Mitsui-Toatsu Chemical Company, describe resin of syndiotactic polypropylene and isotactic polypropylene, as well as their films.

A further example of attempts to gain some benefit from the crystalline nature of isotactic polypropylene but maintaining ease of processing is found in U.S. Pat. No. 5,603,696 in which minor amounts of isotactic polypropylene is included with a majority of sPP to form molded articles. This concept is applied again in U.S. Pat No. 5,269,807 in which suture material is produced from blended sPP and iPP or static PP.

SUMMARY OF THE INVENTION

Our invention provides, at least, polymer composition comprising highly isotactic polypropylene and syndiotactic polypropylene (sPP). Our composition provides material useful in numerous applications, particularly in production of films and articles made from films including pouches, bags, barriers, and other items. Such articles, including these films and articles from them, provide notable clarity, toughness, and yet are soft and pleasant to the touch. Films also display elastomeric character low solvent solubility, particularly in xylene.

DETAILED DESCRIPTION

This invention provides embodiments of composition of poly-α-olefin which is highly isotactic yet provides articles, particularly films and their manufactured articles, which display beneficial properties derived from isotactic materials yet are softer than the generally more brittle pure isotactic compositions. Highly isotactic, therefore highly crystalline, polypropylene is particularly beneficially useful in the practice of our invention. For the purposes of describing our invention, "highly isotactic" intends polymer having isotactic character of greater than about 93%, preferably greater than about 96%; in other words, the polymer chain usefully will display an error rate of non-isotactic monomer insertion of less than about 7%, preferably less than about 4%.

One embodiment of our invention provides at least polymer composition comprising at least about 70% highly crystalline isotactic polypropylene and syndiotactic poly-α-olefin in an amount in the range of about 0.01% through about 30%. Other processing and performance additives may be usefully included in such composition.

Polyolefin composition, the majority of which is highly isotactic polyolefin, comprising the property of heat of melting ($\Delta H_m$) greater than or equal to about 89 J/g. Usefully, such composition will, when cast into film of thickness of about 0.08 mm (0.003 in.) comprise properties such that film displays a) 1% Secant Modulus in machine, transverse, or both direction of less than or equal to about 850 MPa;

b) dart drop impact of equal to or greater than about 250 g; or d) combinations thereof.

Notably usefully, such material will provide film properties such that:

a) 1% Secant Modulus in machine, transverse, or both direction of less than or equal to about 800 MPa;

b) dart drop impact of equal to or greater than about 200 g; or c) combinations thereof.

Useful additives to compositions of these embodiments include stabilizers able to inhibit oxidation and thermal degradation including hindered phenolics and amines and their combinations, melt stabilizers or secondary stabilizers to assist prevention of degradation during melt processing including various phosphite inhibitors, and mold release agents or die lubricants including metal stearates, fluoropolymers, and their combinations. Other useful additives may include those particularly designed for ultraviolet (UV) stabilization and radiation stabilizers for materials and articles to be subjected to irradiation or sterilization by electron bombardment (β radiation) or gamma radiation as well as nucleators or clarifiers, antiblock agents such as silica, and anti-static materials including glycerol monostearate, fatty amides, and fluoropolymers.

Each of the polymer compositions described here may benefit from variations in the makeup of composition. Progressively preferred lower limits of HCPP will be at least about 70%, about 80%, and at least about 90%. Progressively preferred lower levels of syndiotactic material will be at least about 1% and at least about 7%.

Films of all of these compositions will have beneficial properties as the level of the HCPP is increased. Articles of films of these compositions will find beneficial use relating to the combination of useful properties deriving from high crystallinity and better flexibility, respectively, from high isotacticity and introduction of sPP.

To assist in clarifying and enhancing understanding of our invention we provide examples of our experimental work with embodiments and compositions of our invention. These examples are to be understood to be useful in illuminating working applications of our invention, they are not intended, nor should they be construed, to be defining in the limitations of the scope and breadth of our invention.

EXAMPLES

Reactor-grade highly crystalline polypropylene (HCPP), available from Fina Oil & Chemical Company in Deer Park, Tex., USA has less than 1% xylene-soluble and 98% of the meso pentad distribution is found on the xylene soluble fraction. A sample of this was obtained for our experimentation. This material was split into portions of about 91 kg. (200 lbs.) each for further processing. We also obtained an amount of reactor-grade material which is syndiotactic polypropylene (sPP), from Fina Oil & Chemical Company for experimentation. A sample of commercially available typical film grade polypropylene (Comm. Film.) was also obtained from Fina Oil & Chemical Company, for use as a comparative material. Various polypropylene compositions were made according to Table 1.

TABLE 1

| Homopol | MFR (dg/min) | Xyl. Sol. (%) | Composition (wt. %) | | | |
|---|---|---|---|---|---|---|
| | | | Ex. 1 | Ex. 2 | Ex. 3 (unmod) | Ex. 4 (comp) |
| HCPP | 12.0 | 1.0 | 95 | 90 | 100 | 0 |
| sPP | 4.0 | 4.0 | 5 | 10 | 0 | 0 |
| Comm. Film | 9.0 | 3.0 | 0 | 0 | 0 | 100 |

Each of the compositions described in Table 1 were compounded using laboratory compounding equipment with 50 ppm of a hindered polyphenolic stabilizer (Irganox 1076 as available from Ciba-Geigy), 1,000 ppm of a hindered phenolic stabilizer (Ethanox 330 as available from Ethyl Corporation), 500 ppm phosphite secondary antioxidant (Irgafos 168 as available from Ciba-Geigy), and 500 ppm die lubricant/mold release agent in the form of calcium stearate.

Polymer composition characteristics were measured for each of the four examples and are displayed in Table 2 below.

TABLE 2

| | Ex. 1 (HCPP + 5% sPP) | Ex. 2 (HCPP + 10% sPP) | Ex. 3 (HCPP) | Ex. 4 (Comm. Film) |
|---|---|---|---|---|
| MFR (dg/min) | 13.7 | 13.6 | 14.0 | 9.8 |
| Xyl. Sol. (%) | 1.5 | 1.7 | 1.1 | 3.0 |
| isotac. (% mmmm) | — | — | 98 | 95 |
| $T_m$* (° C.) | 164.6 | 165.3 | 165.2 | 165.6 |

TABLE 2-continued

| | Ex. 1 (HCPP + 5% sPP) | Ex. 2 (HCPP + 10% sPP) | Ex. 3 (HCPP) | Ex. 4 (Comm. Film) |
|---|---|---|---|---|
| $\Delta H_m$ (J/g) | 92.6 | 94.1 | 97.9 | 86.6 |
| Mn/1000 | 27 | 29 | 28 | 34 |
| Mw/1000 | 215 | 214 | 222 | 240 |
| Mz/1000 | 822 | 802 | 826 | 867 |
| D | 7.9 | 7.5 | 8.0 | 7.2 |
| D' | 3.8 | 3.7 | 3.7 | 3.6 |

*$T_m$ was determined as the peak temperature from the DSC endotherm.

Thermal characteristics listed were determined by differential scanning calorimetry (DSC) using a Perkin-Elmer DSC 7. For each of the exemplary compositions, about 5–10 mg of polymer composition pellet was placed in an aluminum DSC pan and melted at about 210° C. for 10 minutes followed by cooling to 50° C. at a rate of 10° C./min while recording a recrystallization exotherm. This was followed by heating to 190° C. at the same rate to record the melting endotherm.

Isotacticity (% mmmm) was determined on xylene/heptane insoluble fractions. Comparison of the heat of melting ($\Delta H_m$) among the Examples demonstrates that the $\Delta H_m$ for each of the sPP-modified HCPP samples falls between those of the pure HCPP and the conventional polypropylene. Isotacticity results (% mmmm) agrees well with DSC results.

Samples of each of the exemplary compositions were cast into films of about 0.08 mm (0.003 in.), using an Egan line with 3.5 in. screw having L/D of 32/1 at 250° C. with the chill roll at 15.6° C. and line speed of 30.5 m/min. Film characteristics were measured. Results of such measurements according to ASTM procedures are displayed in Table 3 below.

TABLE 3

| | Ex. 1 (HCPP + 5% sPP) | Ex. 2 (HCPP + 10% sPP) | Ex. 3 (HCPP) | Ex. 4 (Comm. Film) |
|---|---|---|---|---|
| TS @ yield MD (MPa) | 20.8 | 21.2 | 23.9 | 17.8 |
| TS @ break MD (MPa) | 12.1 | 14.7 | 10.3 | 23.1 |
| EL @ yield MD (%) | 9.3 | 8.9 | 7.9 | 9.1 |
| EL @ break MD (%) | 388 | 438 | 333 | 507 |
| 1% Sec. Mod. MD (MPa) | 765 | 723 | 882 | 758 |
| Toughness MD (N-m/m$^2$) | 59.7 | 69.0 | 57.4 | 75.5 |
| TS @ yield TD (MPa) | 21.0 | 21.4 | 24.7 | 19.4 |
| TS @ break TD (MPa) | 8.6 | 14.3 | 10.6 | 12.3 |
| EL @ yield (%) | 8.7 | 8.9 | 9.1 | 9.1 |
| EL @ break TD (%) | 49.3 | 428 | 56.3 | 378 |
| 1% Sec. Mod. MD (MPa) | 744 | 679 | 861 | 723 |
| Toughness TD (N-m/m$^2$) | 16.6 | 65.8 | 8.5 | 49.8 |
| Dart Drop Impact (g) | 252 | 223 | 115 | 454 |
| Gloss, 45, % | 53.8 | 41.1 | 61.3 | 62.0 |
| Haze, % | 11.0 | 15.3 | 10.0 | 5.9 |

As review of the polymer composition film test results demonstrates, practice of our invention will yield films, and their manufactured articles, having enhanced tensile strength and elongation at break or better toughness over the pure HCPP than is demonstrated by the toughness measurement which was the area under the stress-strain curve. Further, it is clear that tensile strength and elongation at break for the sPP-modified Examples were greater than those of the HCPP; indicating enhanced strength over the more brittle HCPP. While gloss and transparency of the films for the sPP-modified Examples decreased, the loss was not so great as to make the modified compositions useless in commerce.

While the physical characteristics of the sPP modified HCPP films which relate to toughness are generally in the range of the typical film grade values, the chemical characteristics, as seen in Table 1, are better by a factor of two. The levels of xylene solubles is approximately half for the sPP modified HCPP than for the typical commercial film grade. Thus film toughness is maintained in useful ranges, perhaps brittleness is increased a bit, but the threats to the environment and health concerns over transfer of low molecular weight volatile molecules are substantially reduced to the food packager by use of films of the modified highly crystalline polypropylene. Workability of the HCPP, to bring it into line with typical film grades is enhanced by inclusion of the syndiotactic polypropylene in the HCPP composition.

Overall, we see benefits to be attained by using the highly crystalline polypropylene and advantageously using its properties derived from the high level of crystallinity while tempering the disadvantage of the material's inherent brittleness.

We claim:

1. Polymer composition comprising at least about 70% highly crystalline polypropylene and syndiotactic poly-α-olefin in an amount in the range of about 0.01% through about 30%.

2. Polypropylene composition comprising at least about 70% highly crystalline polypropylene and syndiotactic polypropylene in an amount in the range of about 5% through about 30%.

3. Polyolefin composition of claim 1 wherein composition further comprises properties such that, when cast into film of thickness of about 0.08 mm (0.003 in.) film displays:
   a) 1% Secant Modulus in machine, transverse, or both direction of less than or equal to about 850 Mpa;
   b) dart drop impact of equal to or greater than about 250 g; or combinations thereof.

4. Composition of claim 3 wherein film properties comprise properties such that:
   a) 1% Secant Modulus in machine, transverse, or both direction of less than or equal to about 800 Mpa;
   b) dart drop impact of equal to or greater than about 200 g; or
   c) combinations thereof.

5. Polymer composition of claim 1 comprising at least about 80% highly crystalline poly-α-olefin and syndiotactic poly-α-olefin in an amount in the range of about 1% through about 20%.

6. Polymer composition of claim 5 comprising at least about 90% highly crystalline poly-α-olefin and syndiotactic poly-α-olefin in an amount in the range of about 5% through about 10%.

7. Film produced of polymer composition of claim 5.

8. Film produced of polymer composition of claim 6.

9. Article of film of claim 7.

10. Article of film of claim 8.

11. Polypropylene composition of claim 2 comprising at least about 80% highly crystalline polypropylene and syndiotactic polypropylene in an amount in the range of about 1% through about 20%.

12. Polypropylene composition of claim 11 comprising at least about 90% highly crystalline polypropylene and syndiotactic polypropylene in an amount in the range of about 5% through about 10%.

13. Film produced of polymer composition of claim 11.

14. Film produced of polymer composition of claim 12.

15. Article of film of claim 13.

16. Article of film of claim 14.

17. Film produced of combination of claim 1.

18. Film produced of composition of claim 3.

19. Film produced of composition of claim 4.

20. Article of film of claim 17.

21. Article of film of claim 18.

22. Article of film of claim 19.

* * * * *